US 12,450,296 B2

(12) United States Patent
Lin et al.

(10) Patent No.: US 12,450,296 B2
(45) Date of Patent: Oct. 21, 2025

(54) SYNCHRONIZING SECURITY GROUPS

(71) Applicant: MICROSOFT TECHNOLOGY LICENSING, LLC, Redmond, WA (US)

(72) Inventors: Isabell Lin, Redmond, WA (US); Paul Mathew, Redmond, WA (US); Ana Monica Irimia, Adliswil (CH); John Ronald Berkeley, Kenmore, WA (US); Thomas Fagerlie Gundersen, Trondheim (NO); Naresh Sundaram, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 373 days.

(21) Appl. No.: 17/893,135

(22) Filed: Aug. 22, 2022

(65) Prior Publication Data
US 2024/0061891 A1 Feb. 22, 2024

(51) Int. Cl.
*G06F 16/93* (2019.01)
*G06F 16/178* (2019.01)
*G06F 21/60* (2013.01)
*G06F 21/62* (2013.01)

(52) U.S. Cl.
CPC .......... *G06F 16/93* (2019.01); *G06F 16/178* (2019.01); *G06F 21/604* (2013.01); *G06F 21/6218* (2013.01)

(58) Field of Classification Search
CPC ...... G06F 16/93; G06F 16/178; G06F 16/907; G06F 21/604; G06F 21/6218
See application file for complete search history.

(56) References Cited

U.S. PATENT DOCUMENTS

| | | | |
|---|---|---|---|
| 7,930,346 B2 * | 4/2011 | Jhaveri | G06F 16/1834 709/227 |
| 8,276,186 B2 | 9/2012 | Deford et al. | |
| 8,756,656 B1 | 6/2014 | Hartmann | |
| 8,984,582 B2 | 3/2015 | Ruppin et al. | |
| 10,469,501 B2 | 11/2019 | Varadamma et al. | |
| 11,829,332 B1 * | 11/2023 | Nayar | G06F 16/93 |

(Continued)

OTHER PUBLICATIONS

Plumley, et al., "Default SharePoint Groups", Retrieved from: https://docs.microsoft.com/en-us/sharepoint/default-sharepoint-groups, Feb. 5, 2022, 5 Pages.

(Continued)

*Primary Examiner* — Oleg Korsak
(74) *Attorney, Agent, or Firm* — Newport IP, LLC; Jacob P. Rohwer

(57) ABSTRACT

Documents maintained by a first storage system that supports security groups are synchronized to a second storage system that supports group entities, which are incompatible with security groups. Permissions associated with the synchronized documents, including security groups, can be synchronized from the first storage system to the second storage system when a security group is created, when membership in a security group is modified, and when a security group is deleted. Synchronization of security groups in this manner can also be selectively enabled on a per-site basis or at another level of granularity.

17 Claims, 13 Drawing Sheets

(56) References Cited

U.S. PATENT DOCUMENTS

| | | | |
|---|---|---|---|
| 2008/0228771 A1* | 9/2008 | Prahlad | G06F 16/2453 |
| | | | 707/999.009 |
| 2010/0251339 A1* | 9/2010 | McAlister | G06F 21/604 |
| | | | 726/4 |
| 2016/0210342 A1* | 7/2016 | Vallabhaneni | G06F 3/065 |
| 2016/0335288 A1* | 11/2016 | Qiu | G06F 16/178 |
| 2017/0235805 A1* | 8/2017 | Shetty | G06F 16/178 |
| | | | 707/634 |
| 2017/0316029 A1* | 11/2017 | Shah | G06F 3/0604 |
| 2019/0188283 A1* | 6/2019 | Fuller | G06F 16/178 |
| 2020/0050687 A1* | 2/2020 | Kaushik | G06F 11/2097 |

OTHER PUBLICATIONS

Roth, et al., "DBCC Show_Statistics (Transact-SQL)", Retrieved from: https://docs.microsoft.com/en-us/sql/t-sql/database-console-commands/dbcc-show-statistics-transact-sql?view=sql-server-ver15, Jun. 7, 2022, 12 Pages.

Stevenson, Dan, "Syncing Security Groups with Team Membership", Retrieved from: https://techcommunity.microsoft.com/t5/microsoft-teams-blog/syncing-security-groups-with-team-membership/ba-p/241959, Sep. 4, 2018, 11 Pages.

* cited by examiner

SYNCHRONIZE DELETION OF SECURITY GROUP

SYNCHRONIZE DELETION OF SECURITY GROUP

SYNCHRONIZE UPDATE TO MEMBERSHIP OF SECURITY GROUP

SYNCHRONIZING SECURITY GROUPS

BACKGROUND

Many types of computing systems maintain permissions for stored documents. For instance, a document storage system might maintain a list of permissions for each stored document, with each permission in the list for a document representing a user or a security group that has access to the document. A security group identifies one or more users that are group members. If a security group has access to a document, each group member is given access to the document.

Some types of software applications utilize two or more separate storage systems. For example, a first storage system might store documents and serve the documents for viewing and editing by users of the first storage system. A second storage system might store a copy of the documents maintained by the first storage system for use in indexing and searching. In these types of configurations, changes made to the documents stored by the first storage system are continuously synchronized to the second storage system. Changes to the permissions associated with the documents stored by the first storage system are also synchronized to the second storage system for use, for example, in pruning search results based on the permissions.

In configurations such as those described above, it is possible for the permissions utilized by the second storage system to be incompatible with those utilized by the first storage system. For example, the first storage system may support security groups such as those described above, while the second storage system may not support security groups or might support a different, incompatible, security group format.

In a scenario such as that described immediately above, modifications to the membership of a security group in the first storage system can be synchronized to the second storage system by synchronizing permissions for all of the documents having permissions that contain the security group. However, because the second storage system does not provide security groups in the same manner as the first storage system, the users identified in each security group must be changed individually for all of the documents in the second storage system having permissions containing the security group.

When this type of solution for synchronizing permissions is utilized in large scale storage systems, the addition of a single user to a storage group or the deletion of a single user from a storage group can result in updating the permissions for thousands, hundreds of thousands, or even millions of documents stored by the second storage system. This process can be time consuming and utilize significant computing resources, such as processor cycles, memory, storage, and power.

It is with respect to these and other technical challenges that the disclosure made herein is presented.

SUMMARY

Technologies are disclosed herein for synchronizing security groups. Through implementations of the disclosed technologies, security groups can be synchronized from a first storage system to a second storage system that does not support security groups or that supports a different, incompatible, security group format, in a manner that does not require all of the users identified in a security group to be changed individually for all of the documents in the second storage system having permissions containing the security group. This can reduce the utilization of computing resources, such as memory and processor cycles, by computing devices implementing the disclosed technologies. Other technical benefits not specifically mentioned herein can also be realized through implementations of the disclosed subject matter.

According to various embodiments, a first storage system stores documents having associated permissions that can include security groups. As discussed above, a security group identifies one or more users that are group members. If a security group has access to a document, each group member is given access to the document. In one embodiment, the first storage system is a content service that provides functionality for allowing users to view and edit the documents. The first storage system might comprise another type of storage system in other embodiments.

Documents maintained by the first storage system are synchronized to a second storage system. The second storage system, however, does not support security groups. Rather, the second storage system stores permissions that support a different security group format, referred to herein as a "group entity," that is incompatible with the security groups maintained by the first storage system. In one embodiment, the second storage system is an indexing service that provides functionality for indexing and searching documents synchronized from the first storage system.

The permissions associated with the documents stored by the first storage system are also synchronized to the second storage system. In this manner, both the documents stored by the first storage system and their associated permissions are synchronized to the second storage system. In embodiments where the second storage system is an indexing service, the second storage system might, for example, prune search results based on the permissions associated with each of the documents.

According to various embodiments disclosed herein, security groups can be synchronized from a first storage system to a second storage system when a security group is created, when membership in a security group is modified, or when a security group is deleted. If a new security group is created at the first storage system, a synchronization service causes the second storage system to create a new group entity identifying the same users as contained in the new security group. When it creates the new group entity, the second storage system also creates a unique identifier ("ID") that is associated with the new group entity.

The synchronization service stores a record that identifies the unique ID for the new group entity and an identifier for the new security group. In this manner, the synchronization service associates the new security group at the first storage system with the new group entity at the second storage system. The synchronization service then synchronizes documents with permissions identifying the new security group from the first storage system to the second storage system by transmitting the documents and the unique ID corresponding to the new group entity. The second storage system utilizes the unique ID to associate the received documents with the group entity corresponding to the unique ID.

If a security group is deleted from the first storage system, the synchronization service deletes the unique ID stored with the permissions of documents having the deleted security group from the first storage system. The synchronization service then causes the second storage system to delete the group entity corresponding to the deleted security group. The synchronization service then resynchronizes documents having the deleted security group from the first storage system to the second storage system. During resynchronization, permissions may be provided for each document that identify the access rights of each user having permissions on the document and the unique ID for the security group is deleted from the permissions of documents.

If membership in a security group is updated at the first storage system, the synchronization service causes the second storage system to update the membership of the group entity such that membership in the security group is the same as membership in the group entity. In this manner, any changes to the membership of the security group are reflected in the corresponding group entity at the second storage system.

In some embodiments, synchronization of security groups in the manner described above can be selectively enabled on a per-site basis or at another level of granularity. In these embodiments, a property is defined for a tenant of the first storage system that specifies one or more sites for which synchronization of security groups is to be performed. Permissions for documents in tenant sites not identified by the property are synchronized by changing the permissions individually for all of the documents in the second storage system having permissions containing a security group.

Once the tenant property has been defined, sites associated with the tenant can be periodically identified for which synchronization of security groups is to be performed. For example, and without limitation, the number of documents associated with each of a tenant's sites might be utilized to determine which of a tenant's sites should be enabled for security group synchronization in the manner described above.

In order to enable synchronization of security groups for a site, the site is added to the property associated with the tenant. Thereafter, security groups associated with the site are synchronized from the first storage system to the second storage system in the manner described briefly above and in greater detail below. Once the security groups have been synchronized, the documents associated with the site are synchronized from the first storage system to the second storage system.

As discussed briefly above, implementations of the technologies disclosed herein provide various technical benefits such as, but not limited to, reducing the utilization of computing resources, such as memory and processor cycles, by computing devices implementing aspects of the disclosed subject matter. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
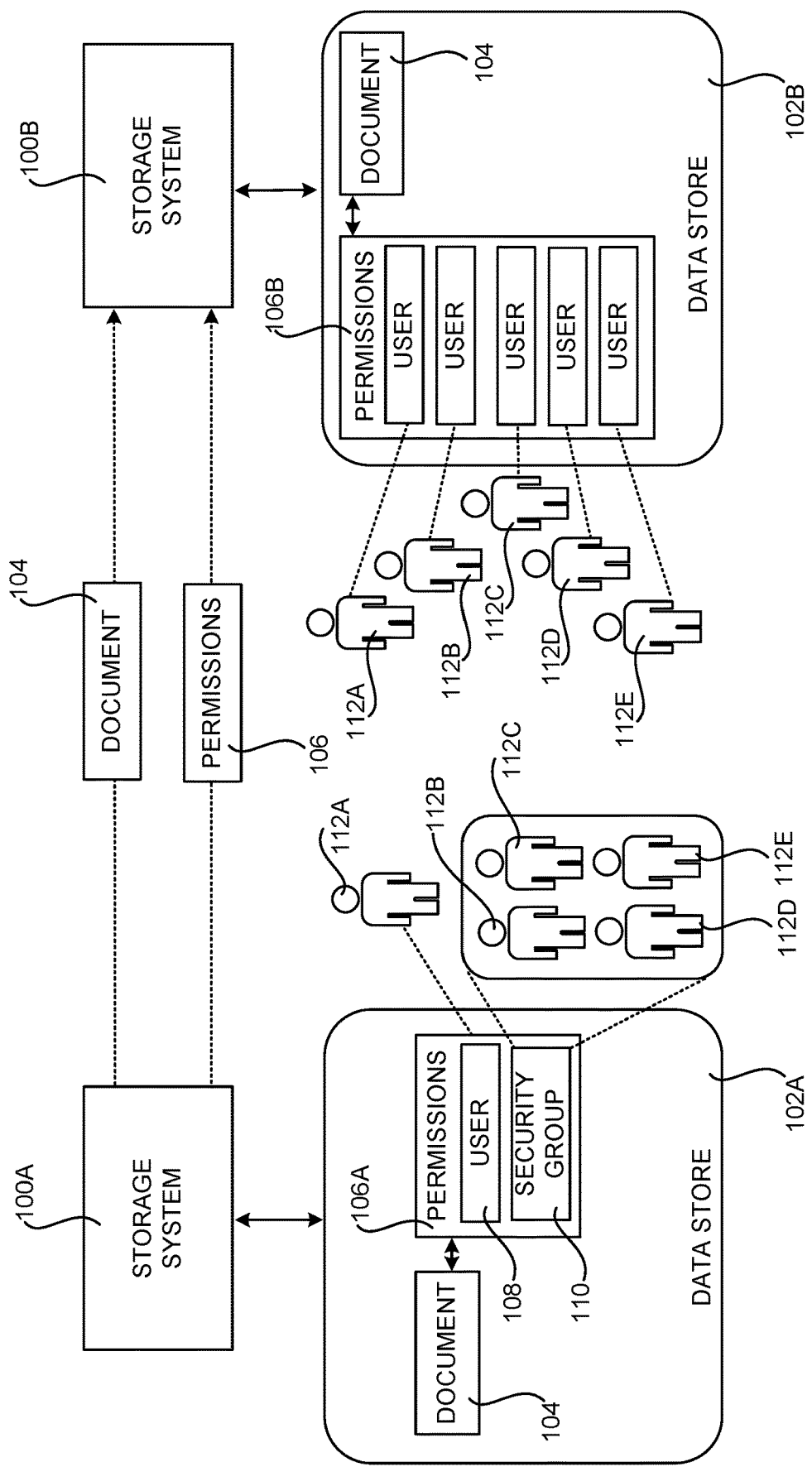
FIG. 1 is a network and computing system architecture diagram showing aspects of a mechanism disclosed herein for synchronizing security groups, according to one embodiment disclosed herein.

The following detailed description is directed to technologies for synchronizing security groups. As discussed briefly above, various technical benefits can be realized through implementations of the disclosed technologies such as, but not limited to, reducing the computing resources needed in order to synchronize document permissions from a storage system that supports security groups to another storage system that does not support security groups or that supports a different security group format. Additionally, the technical benefits disclosed herein can be realized without modification to a target storage system and without negatively impacting the performance of the target storage system. Other technical benefits not specifically mentioned herein can also be realized through implementations of the disclosed subject matter.

While the subject matter described herein is presented in the general context of computing devices implementing storage systems, those skilled in the art will recognize that other implementations can be performed in combination with other types of computing devices, systems, and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for synchronizing security groups will be described.

FIG. 1 is a network and computing system architecture diagram showing aspects of a mechanism disclosed herein for synchronizing security groups, according to one embodiment disclosed herein. As discussed briefly above, many types of computing systems maintain permissions for stored documents. For instance, a storage system, such as the storage system 100A shown in FIG. 1, might maintain a list of permissions 106A for each document 104 in a data store 102A, with each permission in the list for a document representing a user permission 108 or a security group 110 that has access to the document 104.

As discussed above, a security group 110 identifies one or more users 112 that are group members. If a security group 110 has access to a document 104, each user 112 identified by the security group 110 would be given access to the document. In the example shown in FIG. 1, for instance, the permissions 106A include a user permission 108 that identifies the permissions for a user 112A and a security group 110 that identifies the permissions for the users 112B-112E. In this manner, all five users 112A-112E are given access to the document 104.

Some types of software applications utilize two or more separate storage systems. For example, a first storage system, such as the storage system 100A shown in FIG. 1, might store documents 104 and serve the documents for viewing or editing by users of the first storage system 100A. A second storage system, such as the storage system 100B shown in FIG. 1, might store a copy of the documents 104 in a data store 102B for use in indexing and searching.

In configurations such as that shown in FIG. 1, changes made to the documents 104 stored by the storage system 100A may be continuously synchronized to the storage system 100B. Changes to the permissions 106A associated with the documents 104 stored by the storage system 100A are also synchronized to the storage system 100B for use, for example, in pruning search results based on the synchronized permissions.

As discussed briefly above, the permissions 106B utilized by the storage system 100B may be incompatible with the permissions 106A utilized by the storage system 100A. For example, the storage system 100A may support security groups 110 such as those described above, while the storage system 100B may not support security groups 110 or might support a different, incompatible, security group format.

In a scenario such as that described immediately above, the membership of a security group 110 in the storage system 100A can be synchronized to the storage system 100B by synchronizing permissions 106 for all of the documents 104 having permissions 106A that contain the security group 110. However, because the storage system 100B does not support security groups 110, the users 112 identified in the security group 110 must be changed individually for all of the documents 104 in the storage system 100B having permissions 106B containing the security group 110. In the example shown in FIG. 1, for instance, permissions 106 are transmitted to the storage system 100B that identify each user 112A-112E that has permissions to the document 104.

When this type of solution for synchronizing permissions is utilized in large scale storage systems, the addition of a single user 112 to a storage group 110 or the deletion of a single user 112 from a storage group 110 can result in updating the permissions 106 for thousands, hundreds of thousands, or even millions of documents 104 stored by the storage system 100B. This process can be time consuming and utilize significant computing resources, such as processor cycles, memory, storage, and power.

In order to address the technical problem described above, and potentially others, technologies are disclosed herein for synchronizing security groups 110 from a first storage system 100A to a second storage system 100B that does not support security groups 110, or that supports a different, incompatible, security group format, in a manner that does not require all of the users 112 identified in a security group 110 to be changed individually for all of the documents 104 in the second storage system 100B having permissions containing the security group 110. This can reduce the utilization of computing resources, such as memory and processor cycles, by computing devices implementing the disclosed technologies. Other technical benefits not specifically mentioned herein can also be realized through implementations of the disclosed subject matter.

Figure 2A:
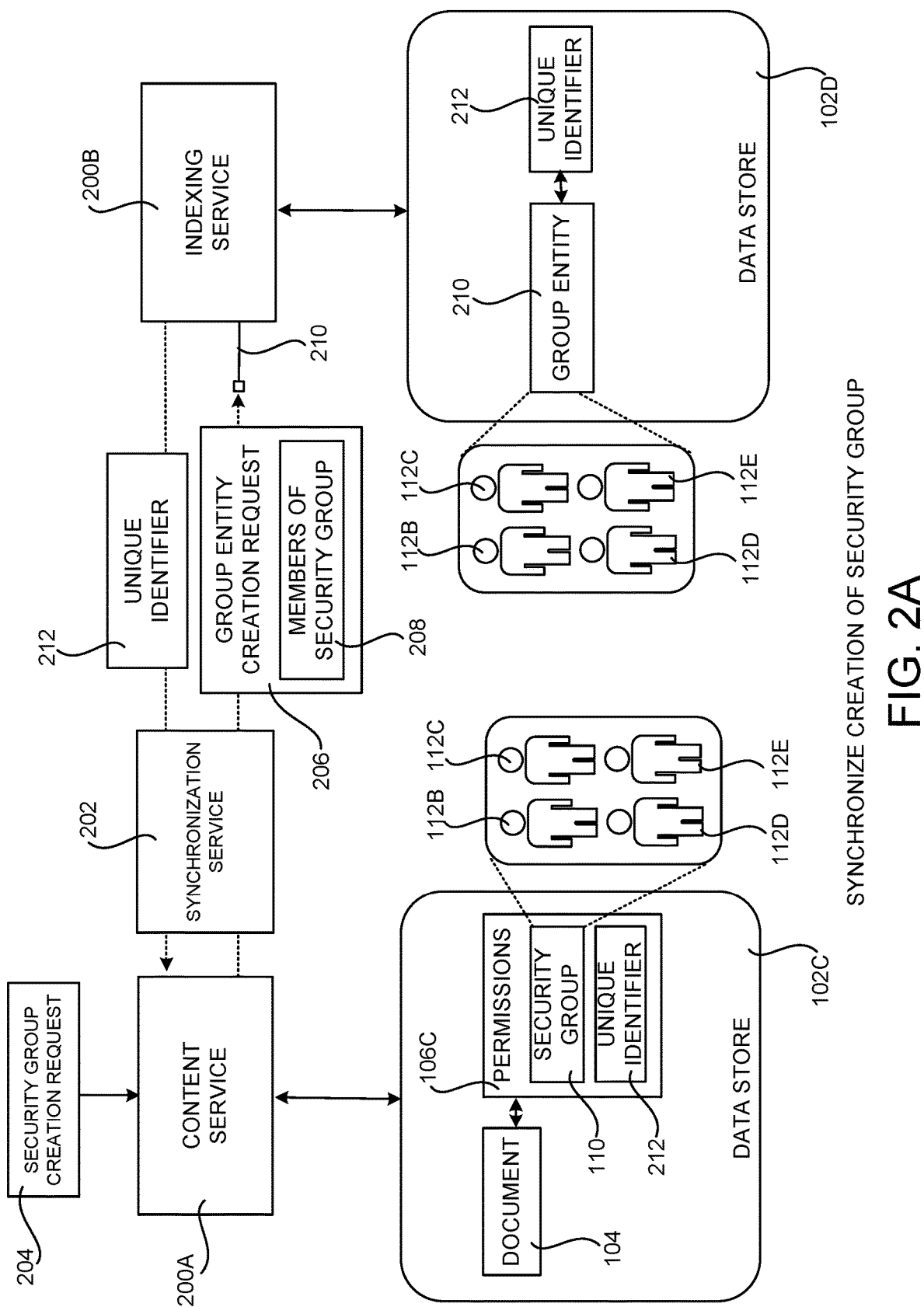
FIG. 2A is a network and computing system architecture diagram showing aspects of a mechanism disclosed herein for synchronizing the creation of a new security group, according to one embodiment disclosed herein.
Figure 2B:
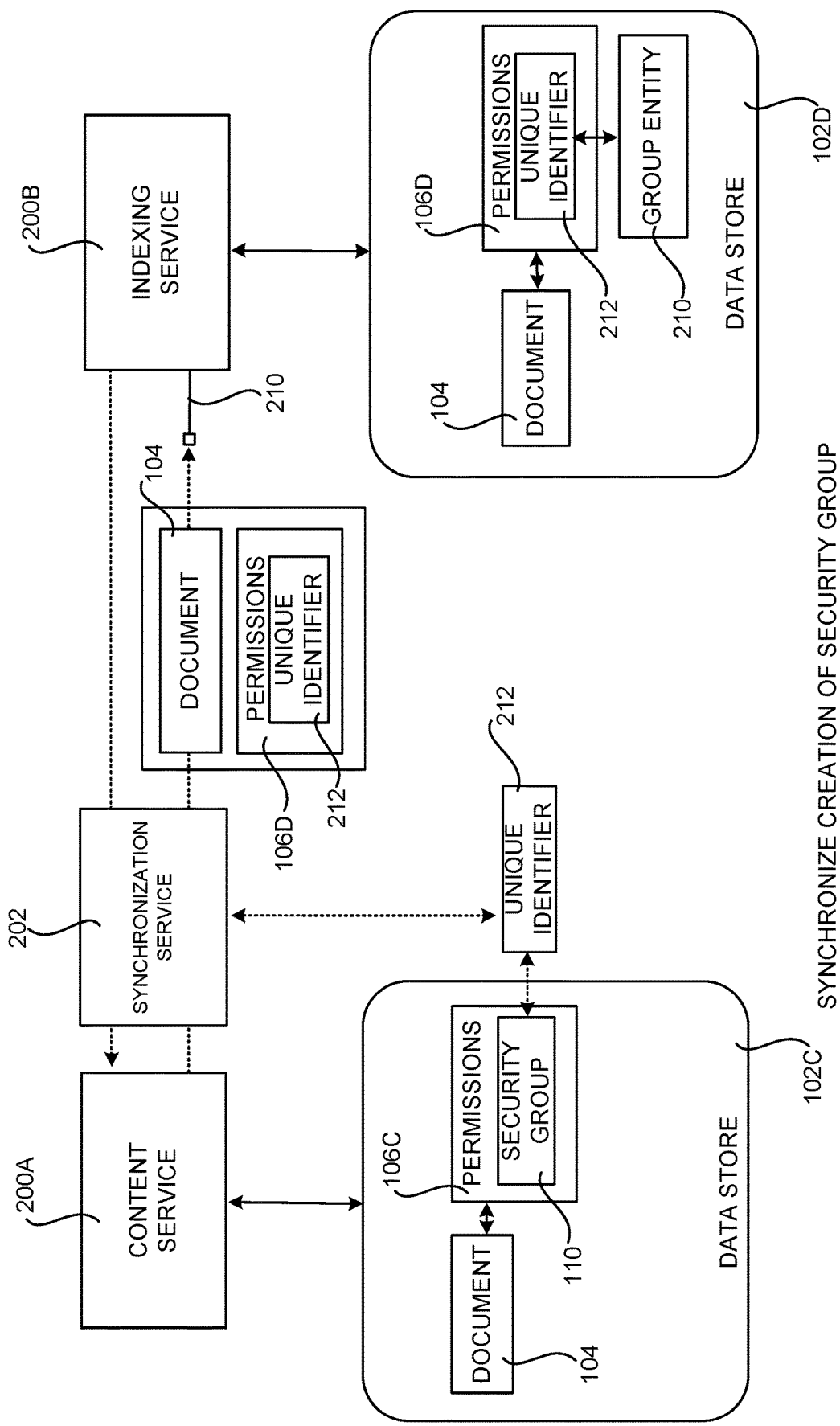
FIG. 2B is a network and computing system architecture diagram showing additional aspects of the mechanism shown in FIG. 2A for synchronizing the creation of a new security group, according to one embodiment disclosed herein.

FIGS. 2A and 2B are network and computing system architecture diagrams showing aspects of a mechanism disclosed herein for synchronizing the creation of a new security group 110, according to one embodiment disclosed herein. In the embodiments described below, the first storage system 100A is a content service 200A that provides functionality that enables users to view and edit documents 104 stored in a data store 102C. For example, and without limitation, the content service 200A might be implemented as a part of a collaboration platform (not shown in FIGS. 2A-2B) that provides functionality for enabling users to create, share, and collaborate on documents 104. The first storage system 100A might comprise another type of system for storing documents 104 in other embodiments.

As discussed briefly above, the documents 104 maintained by the content service 200A are synchronized to a second storage system 100B. In the embodiments discussed below, the second storage system 100B is an indexing service 200B that provides functionality for indexing and searching documents 104 synchronized from the content service 200A and stored in the data store 102D. For example, and without limitation, the indexing service 200B might be implemented as a part of a collaboration platform in order to enable functionality for allowing users to search the documents 104.

In the embodiments discussed below, the content service 200A supports the creation and utilization of security groups 110. The indexing service 200B, however, does not support security groups 110. Rather, the indexing service 200B stores permissions that support a different security group format, referred to herein as a "group entity 210," that is incompatible with the security groups 110 maintained by the content service 200A.

As discussed above, the permissions 106C associated with the documents stored by the content service 200A are also synchronized to the indexing service 200B. In this manner, both the documents 104 stored by the content service 200A and their associated permissions 106C are synchronized to the indexing service 200B.

According to various embodiments disclosed herein, security groups can be synchronized from the content service 200A the indexing service 200B when a security group 110 is created, when membership in a security group 110 is modified, or when a security group 110 is deleted. Details regarding the synchronization of a new security group 110 are provided below with respect to FIGS. 2A-3. Details regarding synchronizing the deletion of a security group 110 are provided below with respect to FIGS. 4A-5. Details regarding the synchronization of updates to the membership of a security group 110 are provided below with respect to FIGS. 6 and 7.

Synchronizing the Creation of a Security Group

In the example shown in FIGS. 2A and 2B, the content service 200A receives a request 204 to create a new security group 110. For instance, a user of the content service 200A might request that a new security group 110 be created and identify the users 112 that are to be included in the membership of the new security group 110. In the example shown in FIGS. 2A and 2B, the new security group 110 includes the users 112B-112E as members. The security group 110 has also been added to the permissions 106C for the document 104.

In response to the creation of the new security group 110 at the content service 200A, a synchronization service 202 transmits a request 206 to the indexing service 200B to create a new group entity 210. As discussed briefly above, the content service 200A utilizes security groups 110 and the indexing service utilizes group entities 210. Security groups 110 and group entities 210 are supported by different computing systems and utilize different mechanisms for specifying group membership.

As illustrated in FIG. 2A, the request 206 transmitted by the synchronization service 202 includes data 208 that defines the members of the newly created security group 110. In the illustrated example, for instance, the data 208 provided with the request 206 identifies the users 112B-112E. The synchronization service 202 may provide the request 206 to the indexing service 200B via a network services application programming interface ("API") 210 or in another manner.

In response to receiving the request 206, the indexing service 200B creates a new group entity 210 that identifies the same users 112 as specified by the new security group 110 (e.g., the users 112B-112E in the illustrated example). When it creates the new group entity 210, the indexing service 200B also creates a unique ID 212 that is associated with the new group entity 210. The indexing service 200B provides the unique ID 212 for the new group entity 210 to the synchronization service 202.

The synchronization service 202 stores a record containing the unique ID 212 for the new group entity 210 and an identifier for the security group 110 corresponding to the new group entity 210. In this manner, the new security group 110 created at the content service 200A is associated with the new group entity 210 at the indexing service 200B by way of the unique ID 212.

Once the new group entity 210 has been created and the unique ID 212 stored by the synchronization service 202, the synchronization service 202 synchronizes documents 104 with permissions 106C identifying the new security group 110 from the content service 200A to the indexing service 200B. For example, and as illustrated in FIG. 2B, the synchronization service 202 might transmit the document 104 along with the unique ID 212 corresponding to the new group entity 210.

As illustrated in FIG. 2B, the indexing service 200B, in turn, stores the unique ID 212 for the group entity 210 in the permissions 106D for the document 104. In this manner, the membership of the security group 110 associated with the document 104 on the content service 200A is synchronized to the group entity 210 associated with the document 104 on the indexing service 200B.

Figure 3:
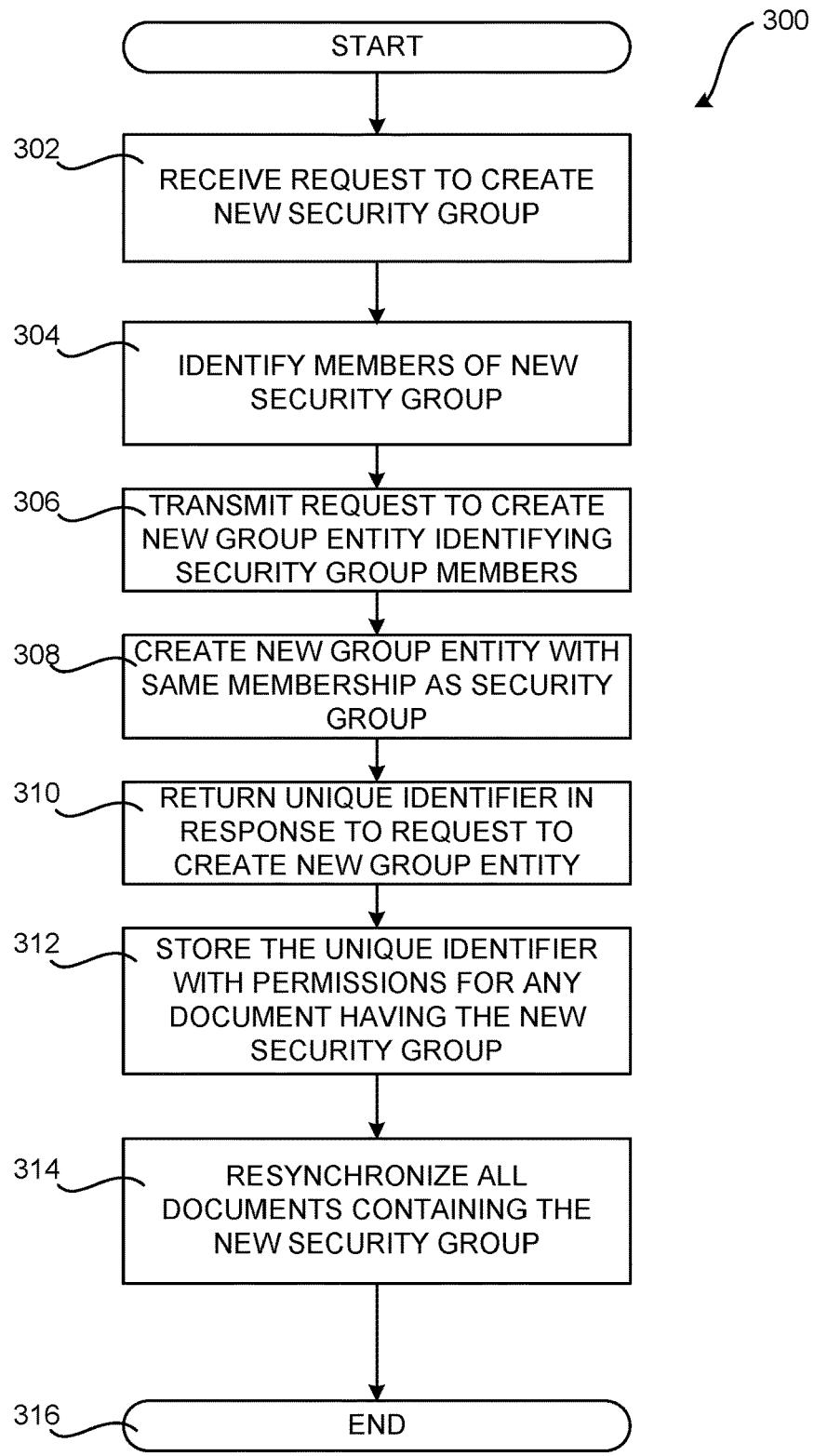
FIG. 3 is a flow diagram showing a routine that illustrates additional aspects of the mechanism shown in FIGS. 2A and 2B for synchronizing the creation of a new security group, according to one embodiment disclosed herein.

FIG. 3 is a flow diagram showing a routine 300 that illustrates additional aspects of the mechanism shown in FIGS. 2A and 2B for synchronizing the creation of a new security group 110, according to one embodiment disclosed herein. It is to be appreciated that the operations of the routines and methods disclosed herein are not presented in any particular order and that performance of some or all of the operations in an alternative order, or orders, is possible and is contemplated. The operations have been presented in the demonstrated order for ease of description and illustration. Operations may be added, omitted, and/or performed simultaneously, without departing from the scope of the appended claims. The illustrated routines and methods can end at any time and need not be performed in their entireties.

Some or all operations of the methods, and/or substantially equivalent operations, can be performed by execution of computer-readable instructions included on a computer-readable storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 5:
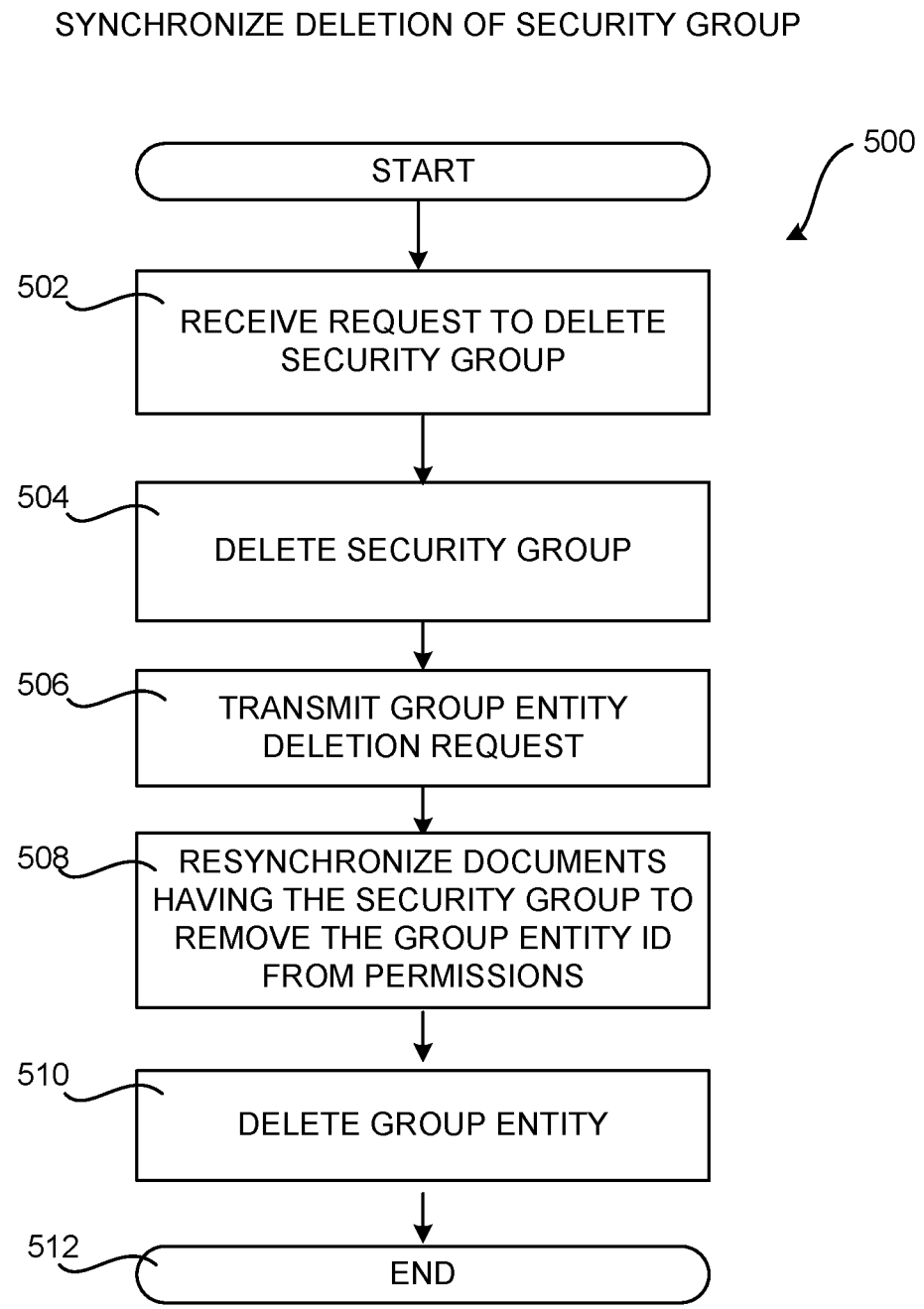
FIG. 5 is a flow diagram showing a routine that illustrates additional aspects of the mechanism shown in FIGS. 4A and 4B for synchronizing the deletion of a security group, according to one embodiment disclosed herein.
Figure 7:
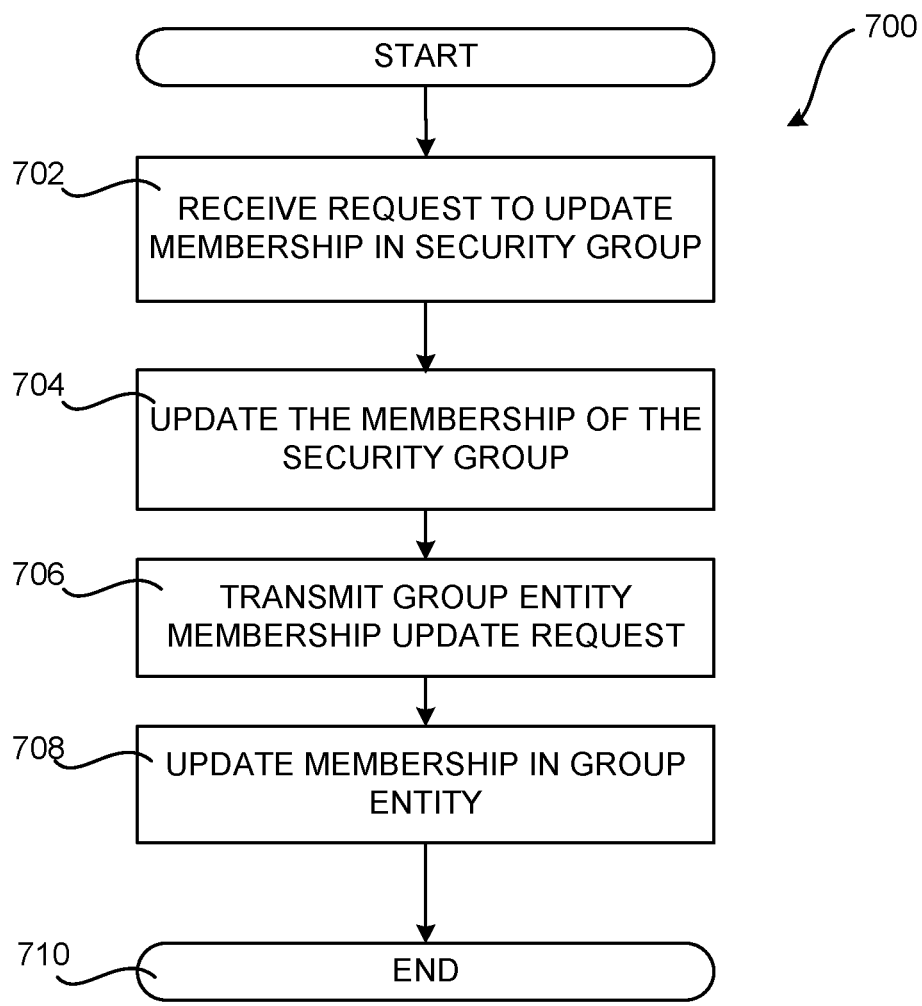
FIG. 7 is a flow diagram showing a routine that illustrates additional aspects of the mechanism shown in FIG. 6 for synchronizing an update to the membership of a security group, according to one embodiment disclosed herein.
Figure 9:
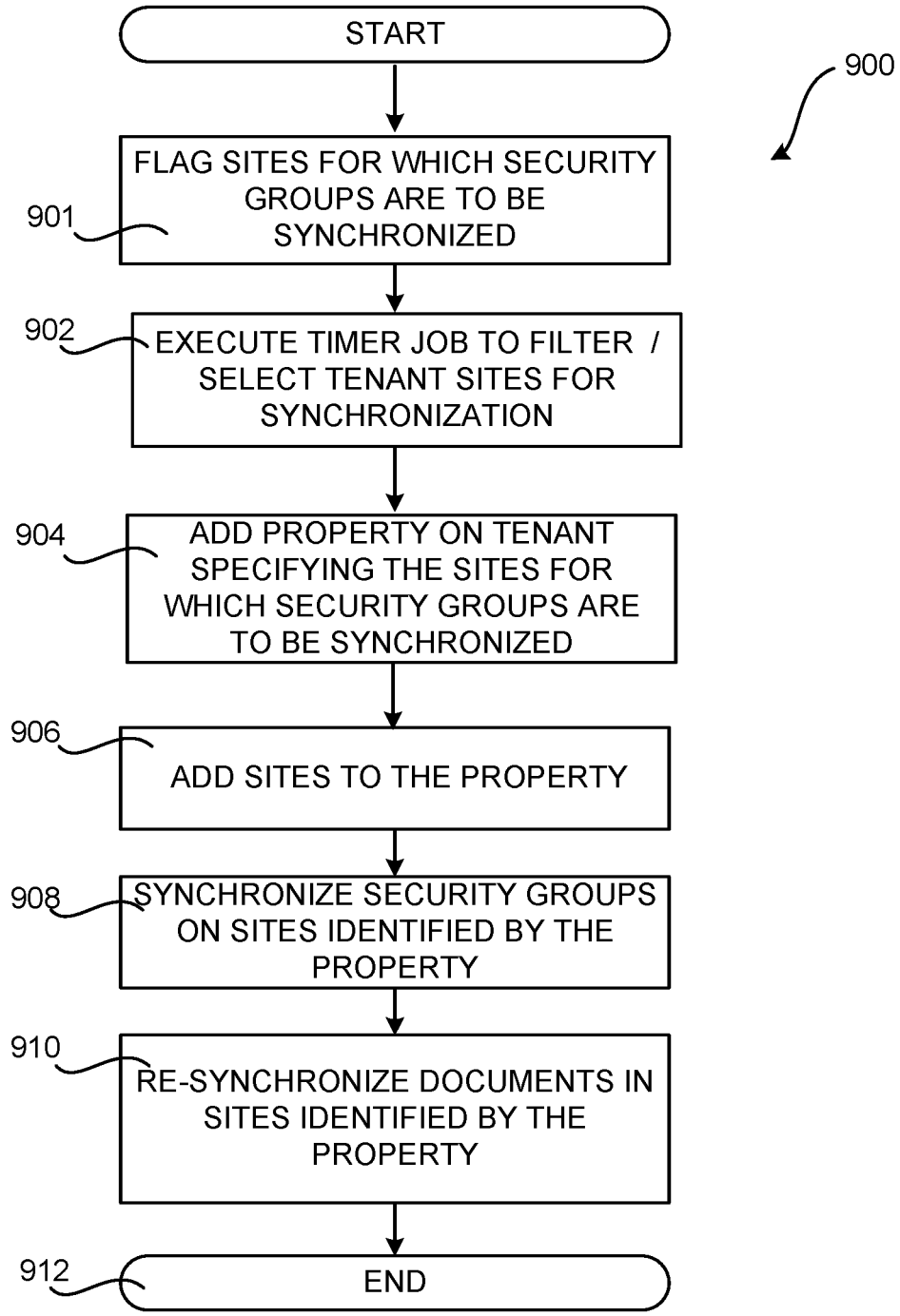
FIG. 9 is a flow diagram showing a routine that illustrates additional aspects of the mechanism shown in FIG. 8 for selectively enabling security group synchronization, according to one embodiment disclosed herein.

For example, the operations of the routine 300 of FIG. 3, the routine 500 of FIG. 5, the routine 700 of FIG. 7, and the routine 900 of FIG. 9 are described herein as being implemented, at least in part, by modules implementing the features disclosed herein and can be a dynamically linked library ("DLL"), a statically linked library, functionality produced by an application programing interface ("API"), a network service, a compiled program, an interpreted program, a script or any other executable set of instructions. Data can be stored in a data structure in one or more memory components. Data can be retrieved from the data structure by addressing links or references to the data structure.

Although the following illustration refers to the components of the FIGS., it can be appreciated that the operations of the routines 300, 500, 700, and 900 may be also implemented in many other ways. For example, the routines 300, 500, 700, and 900 may be implemented, at least in part, by a processor of another remote computer or a local circuit. In addition, one or more of the operations of the routines 300, 500, 700, and 900 may alternatively or additionally be implemented, at least in part, by a chipset working alone or in conjunction with other software modules. In the example described below, one or more modules of a computing system can receive and/or process the data disclosed herein. Any service, circuit, or application suitable for providing the disclosed techniques can be used in operations described herein. The operations illustrated in FIGS. 3, 5, 7, and 9 can be performed, for example, by the computing device 1000 described below with regard to FIG. 10.

The routine 300 begins at operation 302, where a request 204 is received to create a new security group 110 at the content service 200A. In response thereto, the content service 200A creates the new security group 110 with membership in the new security group 110 defined by the request 204. The routine 300 then proceeds from operation 302 to operation 304, where the synchronization service 202 determines that a new security group 110 has been created and identifies the members of the new security group 110. The routine 300 then proceeds from operation 304 to operation 306.

At operation 306, the synchronization service 202 transmits a request 206 to the indexing service 200B to create a new group entity 210. As discussed above, the request 206 includes data 208 that specifies the membership for the new group entity 210, which is the same as the membership of the new security group 110. From operation 306, the routine 300 proceeds to operation 308, where the indexing service 200B creates the new group entity 210 in response to receiving the request 206. The membership of the new group entity 210 is the same as the membership of the new security group 110.

From operation 308, the routine 300 proceeds to operation 310, where the indexing service 200B creates and returns the unique ID 212 associated with the newly created group entity 210. The routine 300 then proceeds from operation 310 to operation 312, where the synchronization service 202 stores a record including the unique ID 212 and an identifier for the new security group 110.

Once the permissions 106C have been updated, the routine 300 proceeds from operation 312 to operation 314, where the synchronization service 202 resynchronizes all documents 104 to the indexing service 200B that contain the new security group 110 in the manner described above with regard to FIG. 2B. The routine 300 then proceeds from operation 314 to operation 316, where it ends.

Synchronizing the Deletion of a Security Group

Figure 4A:
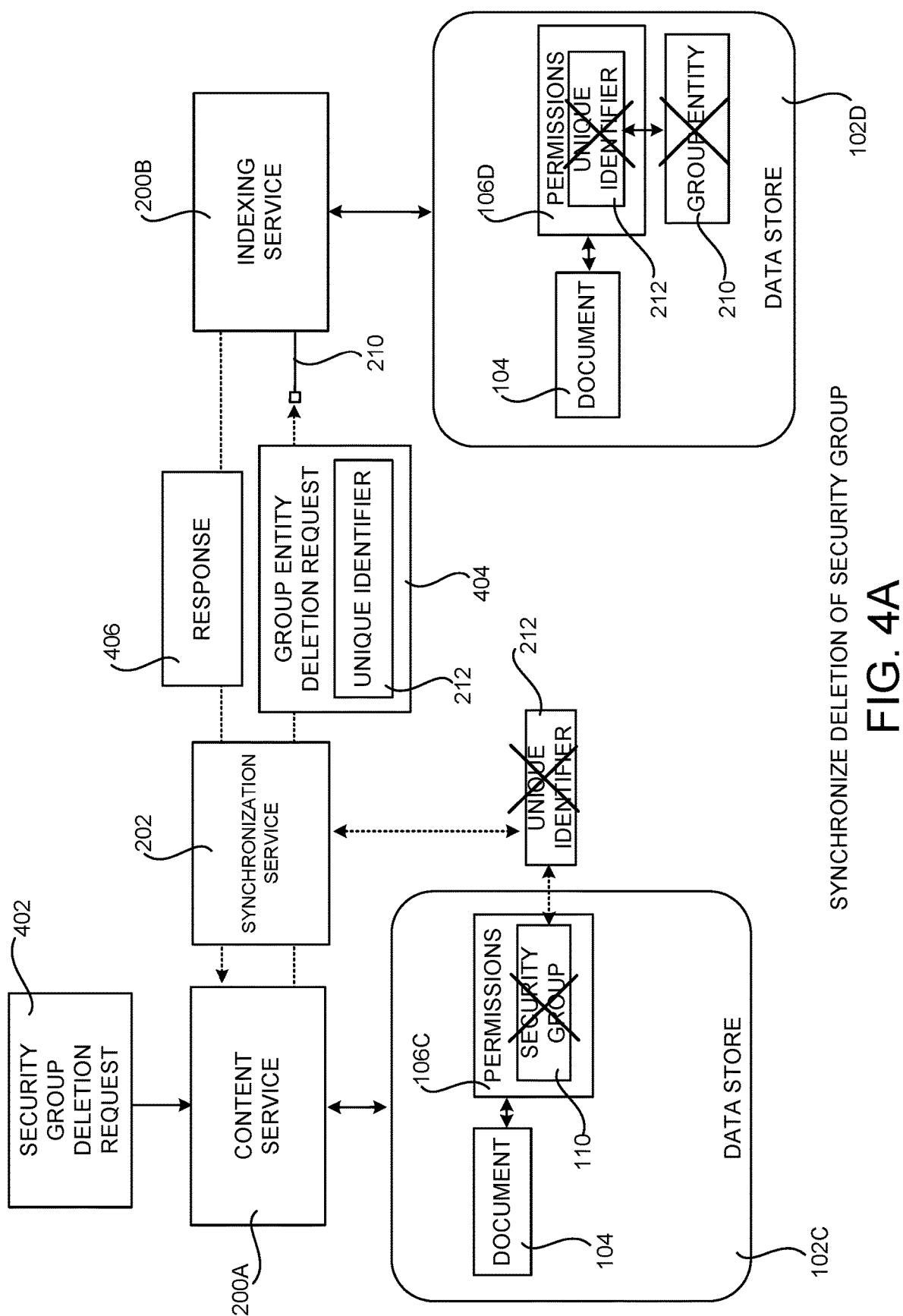
FIG. 4A is a network and computing system architecture diagram showing aspects of a mechanism disclosed herein for synchronizing the deletion of a security group, according to one embodiment disclosed herein.
Figure 4B:
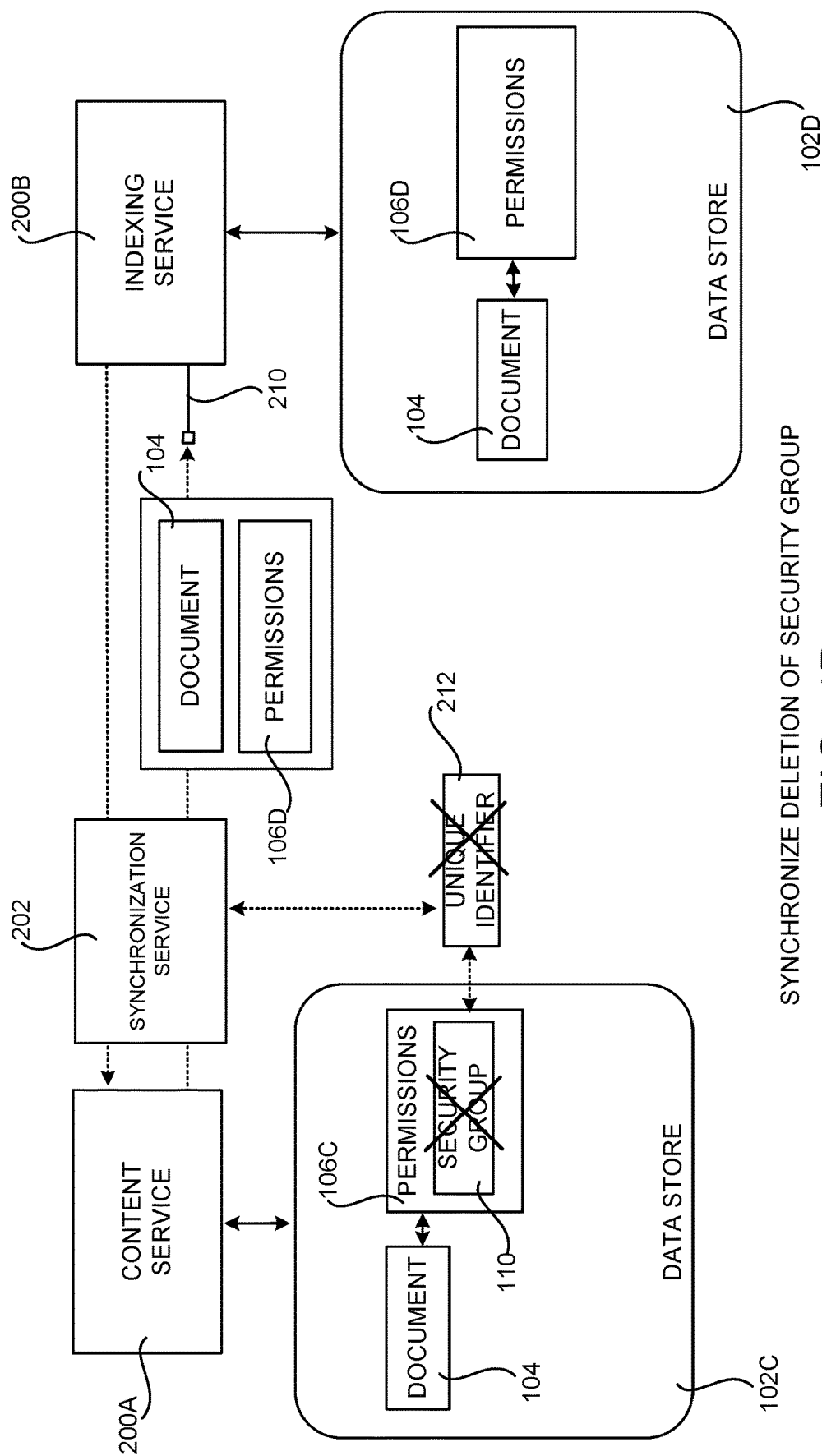
FIG. 4B is a network and computing system architecture diagram showing additional aspects of the mechanism shown in FIG. 4A for synchronizing the deletion of a security group, according to one embodiment disclosed herein.

FIGS. 4A and 4B are network and computing system architecture diagrams showing aspects of a mechanism disclosed herein for synchronizing the deletion of a security group 110, according to one embodiment. In the example shown in FIGS. 4A and 4B, a request 402 has been received at the content service 200A to delete the security group 110. In response thereto, the content service 200A deletes the security group 110 from the permissions 106C of any document 104 containing the security group 110. The synchronization service 202 also deletes the previously stored unique ID 212.

The synchronization service 202 also transmits a request 404 to delete the group entity 210 corresponding to the deleted security group 110 to the indexing service 200B and, simultaneously, initiates a process to resynchronize all of the documents 104 associated with the deleted security group 110. As shown in FIG. 4A, the request 404 includes the unique ID 212 for the group entity 210 corresponding to the deleted security group 110. In response to receiving the request 404, the indexing service 200B deletes the group entity 210.

As shown in FIG. 4B, once the security group 110 and the group entity 210 have been deleted, the synchronization service 202 resynchronizes any documents 104 having the deleted security group from the content service 200A to the indexing service 200B. After resynchronization has completed, the indexing service 200B deletes the unique ID 212 corresponding to the deleted group entity 210. During resynchronization, permissions 106D may be provided for each document 104 that identify the access rights of each 112 user having permissions on the document 104 in the manner described above with regard to FIG. 1.

FIG. 5 is a flow diagram showing a routine 500 that illustrates additional aspects of the mechanism shown in FIGS. 4A and 4B for synchronizing the deletion of a security group 110, according to one embodiment disclosed herein. The routine 500 begins at operation 502, where the content service 200A receives a request 402 to delete a security group 110. In response thereto, the routine 500 proceeds to operation 504, where the content service 200A deletes the security group 110. As discussed above, the synchronization service 202 also deletes the unique ID 212 stored with the permissions 106C of documents 104 having the deleted security group 110.

From operation 504, the routine 500 proceeds to operation 506, where the synchronization service 202 transmits a request 404 to the indexing service 200B to delete the group entity 210 corresponding to the deleted security group 110. The routine 500 then proceeds to operation 508, where the synchronization service 202 resynchronizes any documents 104 having the deleted security group 110 from the content service 200A to the indexing service 200B. During resynchronization, permissions 106D may be provided for each document 104 that identify the access rights of each 112 user having permissions on the document 104 in the manner described above with regard to FIG. 1. As discussed above, the operations 506 and 508 may be performed substantially simultaneously.

From operation 508, the routine 500 proceeds to operation 510, where the indexing service 200B deletes the group entity 210 associated with the unique ID 212 specified in the request 404. As discussed above, the indexing service 200B also removes the unique ID 212 for the group entity 106 from the permissions 106D of any documents 104 having the unique ID 212 stored therein. The routine 500 then proceeds from operation 510 to operation 512, where it ends.

Synchronizing Updates to the Membership of a Security Group

Figure 6:
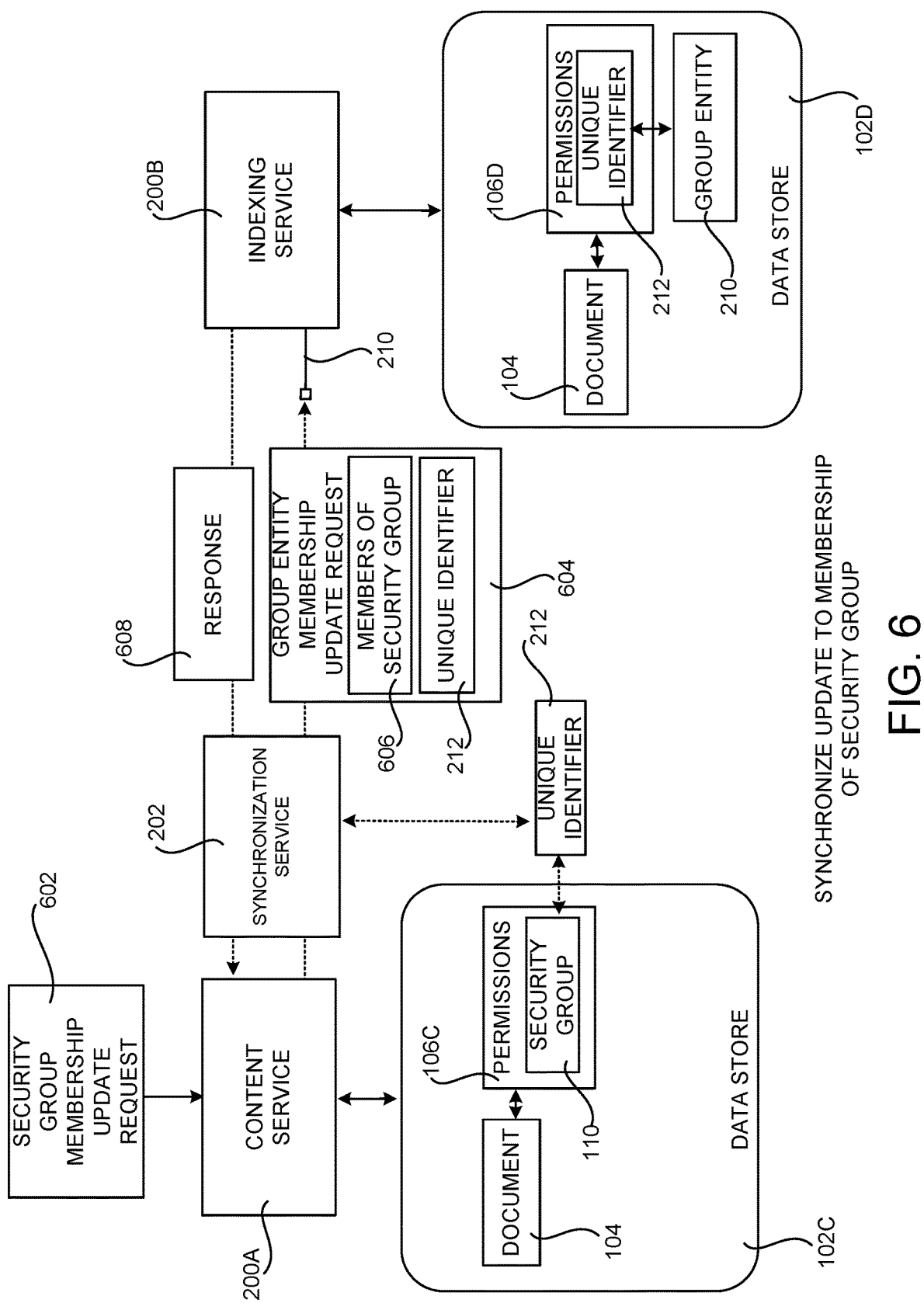
FIG. 6 is a network and computing system architecture diagram showing aspects of a mechanism disclosed herein for synchronizing an update to the membership of a security group, according to one embodiment disclosed herein.

FIG. 6 is a network and computing system architecture diagram showing aspects of a mechanism disclosed herein for synchronizing an update to the membership of a security group 110, according to one embodiment disclosed herein. In the example shown in FIG. 6, a request 602 has been received at the content service 200A to update the membership of the security group 110. For example, the request 602 might specify that users 112 (shown in FIGS. 1 and 2A) are to be added to or removed from the security group 110.

In response to receiving the request 602, the content service 200A updates the membership of the security group 110 as indicated by the request 602. The synchronization service 202 also transmits a request 604 to the indexing service 200B to update the membership of the group entity 210 corresponding to the security group 110 that had its membership changed. As shown in FIG. 6, the request 604 includes the unique ID 212 for the group entity 210 along with data 606 specifying the updated membership for the security group 110.

In response to receiving the request 604, the indexing service 200B updates the membership of the group entity 210 identified by the unique ID 212 specified in the request 604. In this manner, if membership in a security group 110 is updated at the content service 200A, the synchronization service 202 causes the indexing service 200B to update the membership of the corresponding group entity 210 such that membership in the security group 110 is the same as membership in the group entity 210. In this way, any changes to the membership of the security group 110 are reflected in the corresponding group entity 210 at the indexing service 200B. Resynchronization of documents 104 is not required when membership to a security group 110 is modified.

FIG. 7 is a flow diagram showing a routine 700 that illustrates additional aspects of the mechanism shown in FIG. 6 for synchronizing an update to the membership of a security group 110, according to one embodiment disclosed herein. The routine 700 beings at operation 702, where the content service 200A receives a request 602 to update the membership of a security group 110. In response to receiving the request 602, the routine 700 proceeds from operation 702 to operation 704, where the content service 200A updates the membership of the security group 110 as indicated by the request.

From operation 704, the routine 700 proceeds to operation 706, where the synchronization service 202 transmits a request 604 to the indexing service 200B to update the membership of the group entity 210 corresponding to the security group 110 that had its membership changed. The routine 700 then proceeds from operation 706 to operation 708, where the indexing service 200B updates the membership of the group entity 210 identified by the unique ID 212 in response to receiving the request 604. The routine 700 then proceeds from operation 708 to operation 710, where it ends.

Failure Handling

As discussed above, when the synchronization service 202 is processing a document 104 having an associated security group 110, the synchronization service 202 adds the unique ID 212 of the corresponding group entity 210 in the storage system 100B to the permissions 106 associated with the document 104. In this scenario, there are at least two opportunities for failure: a missing security group 110 or a missing group unique ID 212.

In the case of a missing security group 110, the synchronization service 202 resynchronizes all of the security groups 110 from the storage system 100A to the storage system 100B to try and obtain the information about the missing security group 110. For the document 104 currently being processed, the synchronization service 202 will not fail the document 104 immediately. The synchronization service 202 would instead build the permissions 106 using the mechanism discussed above with regard to FIG. 1 wherein the synchronization service 202 individually adds user membership to permissions 106B rather than the unique ID 212. The document 104 will continue be retried every four hours (or other time period), until either the information for the missing security group 110 is in the synchronization service 202, or if the time is over 72 hours (or another period) after the updated to the document 104 took place. After retrying for 72 hours (or another period of time), synchronization of the document 104 will fail and other retry mechanisms of the synchronization service 202 may be initiated.

In the case of a missing unique ID 212 for a group entity 210, the synchronization service 202 builds the permissions 106 using the mechanism discussed above with regard to FIG. 1. Synchronization of the document 104 will continue be retried every four hours (or other time period), until either the information for the missing unique ID 212 is in the synchronization service 202, or if the time is over 72 hours (or another period) after the updated to the document 104 took place. After retrying for 72 hours (or another period of time), synchronization of the document 104 will fail and other retry mechanisms of the synchronization service 202 may be initiated.

Selective Synchronization of Security Groups

Figure 8:
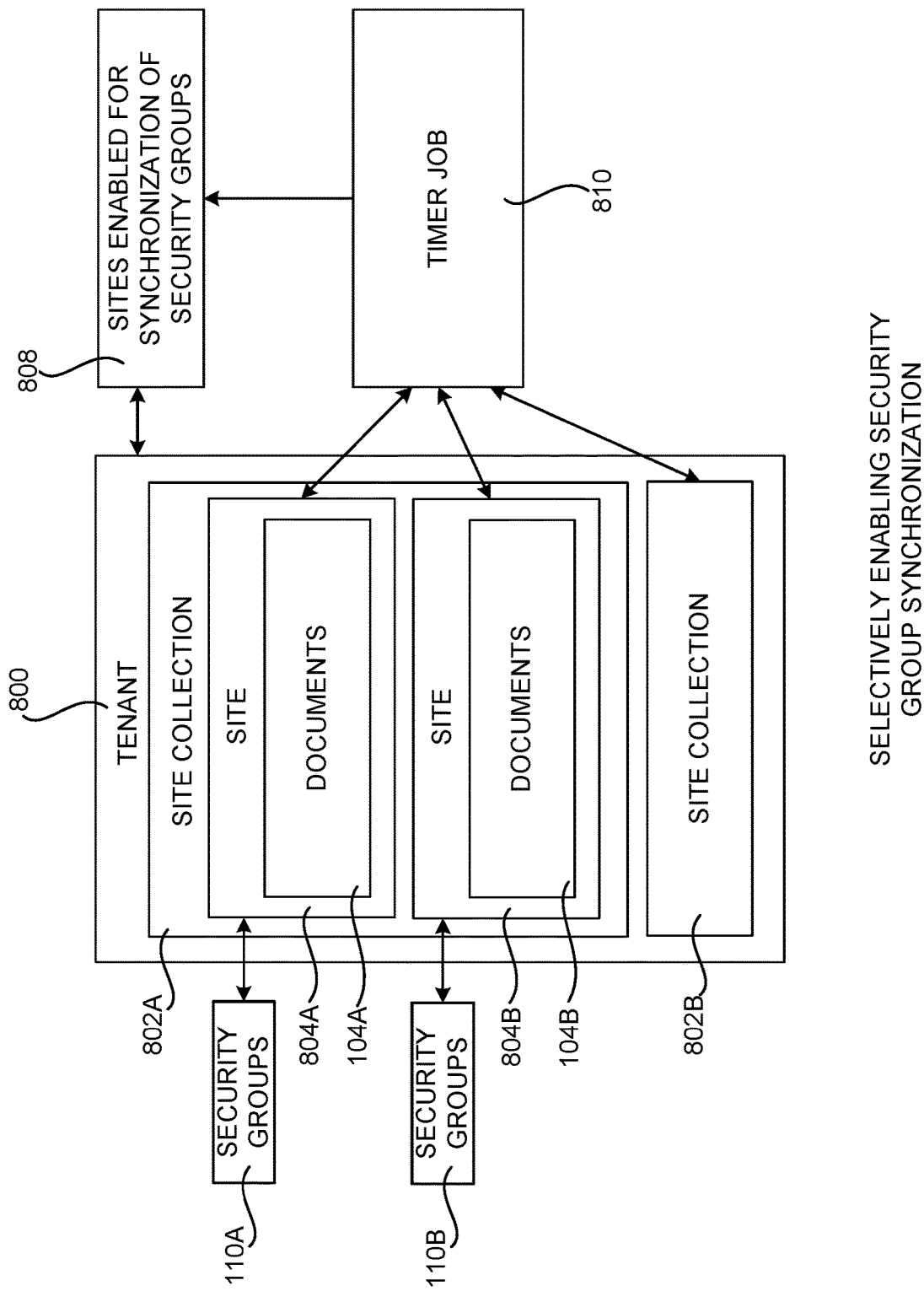
FIG. 8 is a network and computing system architecture diagram showing aspects of a mechanism disclosed herein for selectively enabling security group synchronization, according to one embodiment disclosed herein.

FIG. 8 is a network and computing system architecture diagram showing aspects of a mechanism disclosed herein for selectively enabling security group synchronization, according to one embodiment disclosed herein. As discussed briefly above, in some embodiments synchronization of security groups 110 in the manner described above can be selectively enabled on a per-site basis or at another level of granularity.

As used herein, the term "site" refers to a collection of documents. A site collection is a collection of sites. In the example shown in FIG. 8, for instance, a tenant 800 of the content service 200A has two site collections 802A and 802B. The site collection 802A has two sites 804A and 804B. The site 804A includes the documents 104A and the site 804B includes the documents 802B.

In the embodiment shown in FIG. 8, security groups 110 are specified at the site level. For example, in the illustrated embodiment, security groups 110A have been defined for the site 804A and security groups 110B have been defined for the site 804B. In this regard, it is to be appreciated that a different organizational structure might be defined for the documents 104 and that security groups 110 might be specified at a different granularity in other embodiments.

In order to enable selective synchronization of security groups 110, a property 808 is defined for a tenant 800 of the content service 200A that specifies one or more sites 804A for which synchronization of security groups 110 is to be performed in the manner described above with regard to FIGS. 2A-7. Permissions for documents 104 in tenant sites 804 not identified by the property 808 are synchronized by changing the permissions 106 individually for all of the documents 104 in the indexing service 200B in the manner described above with regard to FIG. 1.

Once the property 808 has been defined, sites 804 associated with the tenant 800 can be periodically identified for which synchronization of security groups 110 is to be performed. For example, and without limitation, the synchronization service 202 can flag the sites 804 having many documents 104 (e.g., sites having more than a predefined number of documents 104. A timer job 810 is then periodically executed in some embodiments that is configured to examine the sites 804 flagged by the synchronization service 202. The timer job 810 may filter the flagged sites 804 based on various criteria and selects sites 804 for which synchronization of security groups 110 is to be performed in the manner described above with regard to FIGS. 2A-7. In some embodiments, the timer job 810 selects sites 804 for synchronization based on the number of documents 104 associated with each of a tenant's sites 804. For instance, the time job 810 might select a site 804, or sites 804, for synchronization in the manner described above with regard to FIGS. 2A-7 that have large numbers of documents.

In order to enable synchronization of security groups 110 for a site 804 in the manner described above with regard to FIGS. 2A-7, the timer job 810 adds the site 804 to the property 808 associated with the tenant 800. Thereafter, security groups 110 associated with the site 804 (and other sites 804 identified by the property 808) are synchronized from the content service 200A to the indexing service 200B in the manner described above with regard to FIGS. 2A-7. Once the security groups 110 have been synchronized, the documents 104 associated with the site 804 are synchronized from the content service 200A to the indexing service 200B.

In some embodiments, a site 804 may be removed from the property 808. If this occurs, the group entity 210, or entities 210, for any security group 110 associated with the site 804 are deleted from the storage system 100B in the manner described above with regard to FIGS. 4A-5. Thereafter, the permissions 106 for documents 104 associated with the removed site 804 are resynchronized to the storage system 100B in the manner described above with regard to FIG. 1.

In some embodiments, the timer job 810 might also be configured to determine whether the number of security groups 110 being synchronized for a tenant 800 exceeds the number of group entities 210 permitted by the storage system 100B. In this case, the timer job 810 might make an indication in the property 808 that no additional sites 802 associated with the tenant 800 are to be enabled for synchronized in the manner described above with regard to FIGS. 2A-7.

FIG. 9 is a flow diagram showing a routine 900 that illustrates additional aspects of the mechanism shown in FIG. 8 for selectively enabling security group synchronization, according to one embodiment disclosed herein. The routine 900 beings at operation 901, where the synchronization service 102 flags sites 804 for synchronization in the manner described above with regard to FIGS. 2A-7. As discussed above, the synchronization service 202 might flag sites 804 for synchronization that include more than a threshold number of documents 104 or based on other criteria.

From operation 901, the routine 900 proceeds to operation 902, where the timer job 810 filters the sites flagged at operation 901 based upon various criteria and selects the site 804, or sites 804, that are to be synchronized in the manner described above with regard to FIGS. 2A-7. From operation 902, the routine 900 proceeds to operation 904, where a property 808 is added on the tenant 800 that specifies the sites 804 for which synchronization of security groups 110 is to be performed in the manner described above with regard to FIGS. 2A-7. The routine 900 then proceeds from operation 904 to operation 906.

At operation 906, the timer job 810 adds any sites 804 selected for synchronization to the property 808. The routine 900 then proceeds from operation 906 to operation 908, where the security groups 110 on sites 804 identified by the property 808 are synchronized in the manner described above with regard to FIGS. 2A-7. Once the security groups 110 have been synchronized, the routine 900 proceeds from operation 908 to operation 910, where the documents 104 in the sites 804 selected for synchronization are also synchronized from the content service 200A to the indexing service 200B. The routine 900 then proceeds from operation 910 to operation 912, where it ends.

Figure 10:
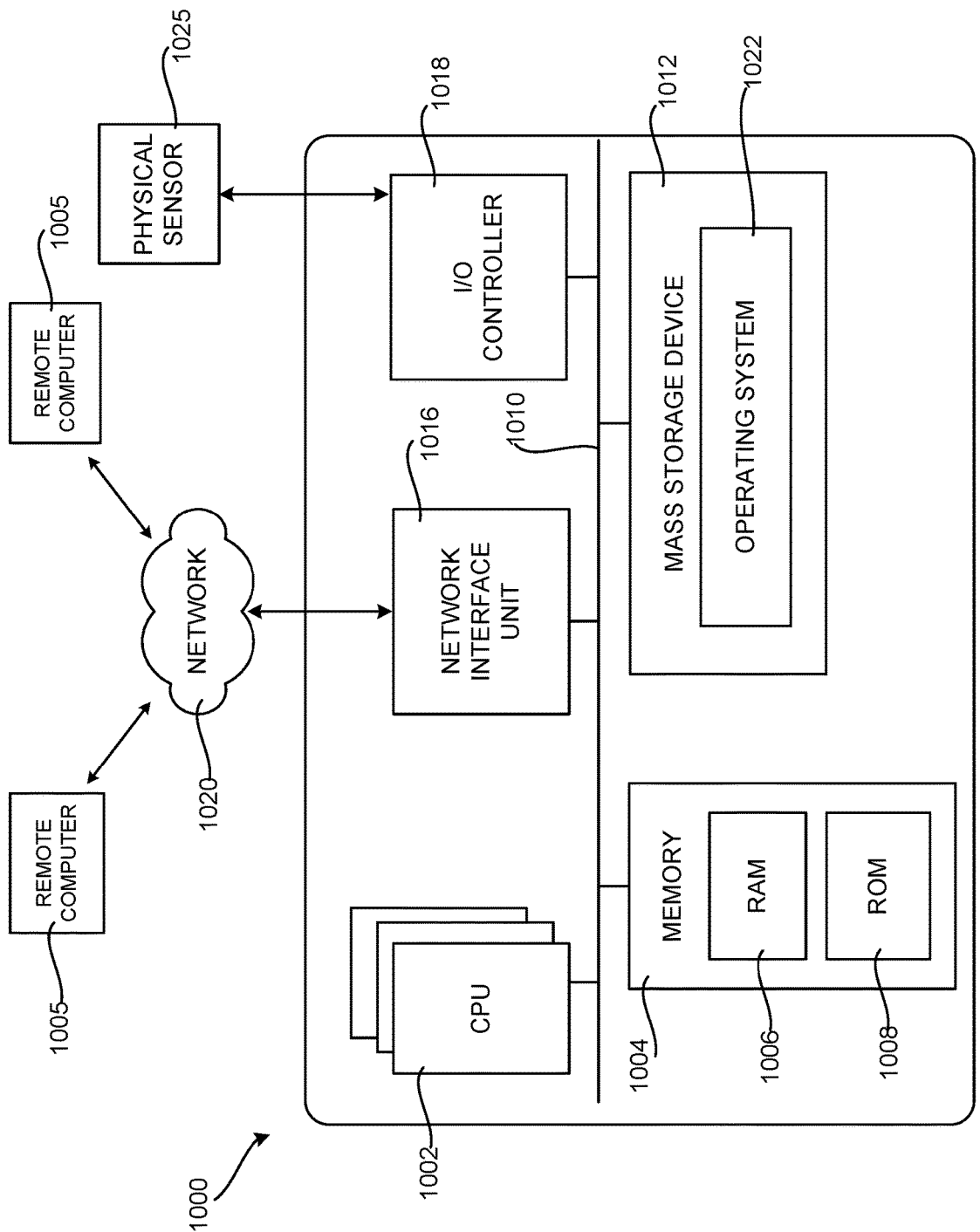
FIG. 10 is a computer architecture diagram showing an illustrative computer hardware and software architecture for a computing device that can implement aspects of the technologies presented herein.

FIG. 10 is a computer architecture diagram showing an illustrative computer hardware and software architecture for a computing device 1000 that can implement the various technologies presented herein. In particular, the architecture illustrated in FIG. 10 can be utilized to implement the storage systems 100A and 100B for providing aspects of the functionality disclosed herein.

The computer 1000 illustrated in FIG. 10 includes one or more central processing units 1002 ("CPU"), a system memory 1004, including a random-access memory 1006 ("RAM") and a read-only memory ("ROM") 1008, and a system bus 1010 that couples the memory 1004 to the CPU 1002. A basic input/output system ("BIOS" or "firmware") containing the basic routines that help to transfer information between elements within the computer 1000, such as during startup, can be stored in the ROM 1008.

The computer 1000 further includes a mass storage device 1012 for storing an operating system 1022, application programs, and other types of programs. In one embodiment, an application program, or programs, executing on the computer 1000 provides the functionality described above with regard to FIG. 1-9. Other modules or program components can provide this functionality in other embodiments. The mass storage device 1012 can also be configured to store other types of programs and data.

The mass storage device 1012 is connected to the CPU 1002 through a mass storage controller (not shown) connected to the bus 1010. The mass storage device 1012 and its associated computer readable media provide non-volatile storage for the computer 1000. Although the description of computer readable media contained herein refers to a mass storage device, such as a hard disk, CD-ROM drive, DVD-ROM drive, or USB storage key, it should be appreciated by those skilled in the art that computer readable media can be any available computer-readable storage media or communication media that can be accessed by the computer 1000.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media can include volatile and non-volatile, removable and non-removable media implemented in any method or technology for storage of information such as computer readable instructions, data structures, program modules or other data. For example, computer-readable storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1000. For purposes of the claims, the phrase "computer-readable storage medium," and variations thereof, does not include waves or signals per se or communication media.

According to various configurations, the computer 1000 can operate in a networked environment using logical connections to remote computers 1005 through a network such as the network 1020. The computer 1000 can connect to the network 1020 through a network interface unit 1016 connected to the bus 1010. It should be appreciated that the network interface unit 1016 can also be utilized to connect to other types of networks and remote computer systems.

The computer 1000 can also include an input/output controller 1018 for receiving and processing input from a number of other devices, including a keyboard, mouse, touch input, an electronic stylus (not shown in FIG. 10), or a physical sensor 1025 such as a video camera. Similarly, the input/output controller 1018 can provide output to a display screen or other type of output device (also not shown in FIG. 10).

It should be appreciated that the software components described herein, when loaded into the CPU 1002 and executed, can transform the CPU 1002 and the overall computer 1000 from a general-purpose computing device into a special-purpose computing device customized to facilitate the functionality presented herein. The CPU 1002 can be constructed from any number of transistors or other discrete circuit elements, which can individually or collectively assume any number of states.

More specifically, the CPU 1002 can operate as a finite-state machine, in response to executable instructions contained within the software modules disclosed herein. These computer-executable instructions can transform the CPU 1002 by specifying how the CPU 1002 transitions between states, thereby transforming the transistors or other discrete hardware elements constituting the CPU 1002.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It also should be appreciated that the architecture shown in FIG. 10 for the computer 1000, or a similar architecture, can be utilized to implement other types of computing devices, including hand-held computers, video game devices, embedded computer systems, mobile devices such as smartphones, tablets, alternate reality ("AR") and virtual reality ("VR") devices, and other types of computing devices known to those skilled in the art. It is also contemplated that the computer 1000 might not include all of the components shown in FIG. 10, can include other components that are not explicitly shown in FIG. 10, or can utilize an architecture completely different than that shown in FIG. 10.

Figure 11:
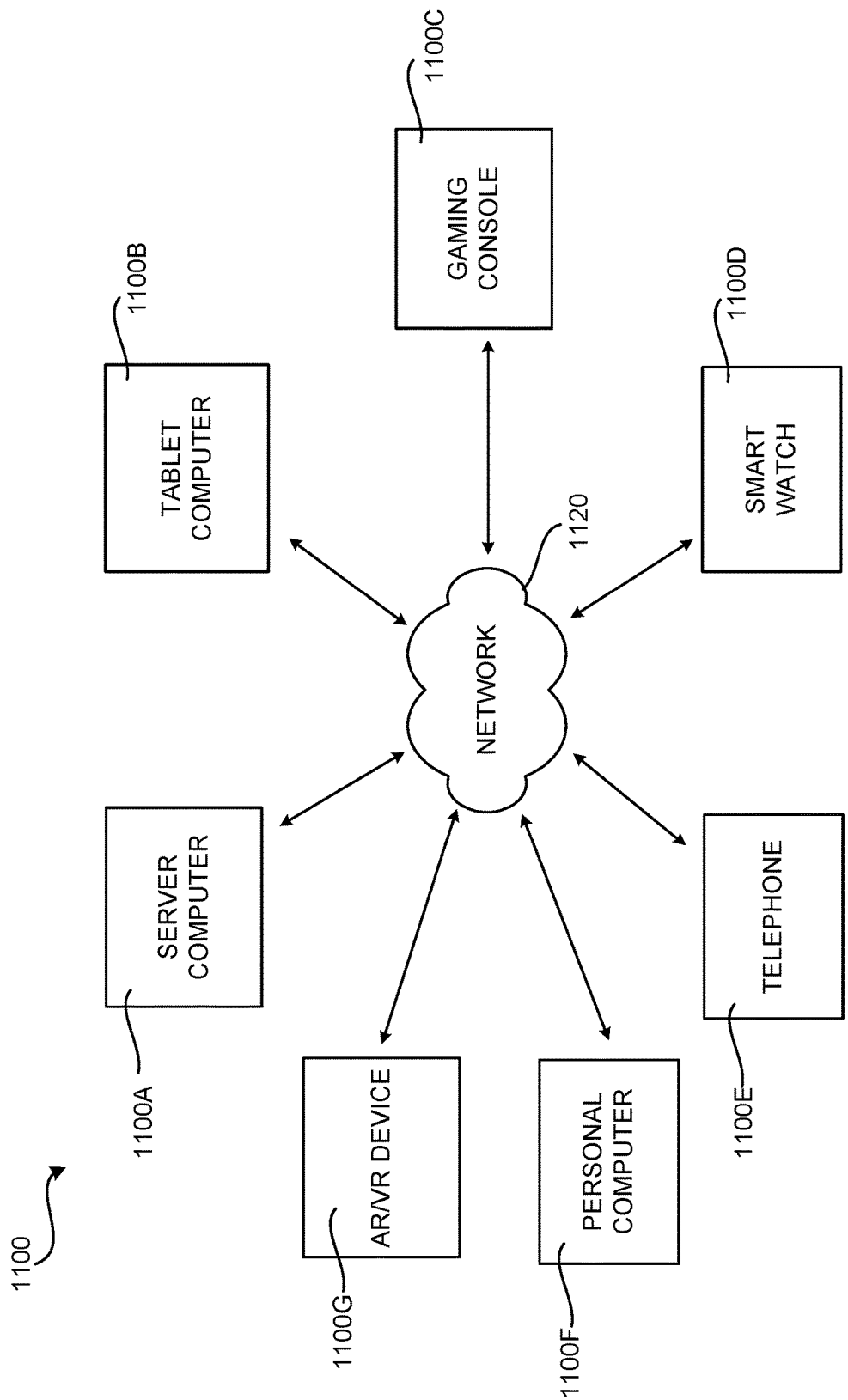
FIG. 11 is a network diagram illustrating a distributed computing environment in which aspects of the disclosed technologies can be implemented.

FIG. 11 is a network diagram illustrating a distributed network computing environment 1100 in which aspects of the disclosed technologies can be implemented, according to various embodiments presented herein. As shown in FIG. 11, one or more server computers 1100A can be interconnected via a communications network 1120 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 1100B, a gaming console 1100C, a smart watch 1100D, a telephone 1100E, such as a smartphone, a personal computer 1100F, and an AR/VR device 1100G.

In a network environment in which the communications network 1120 is the Internet, for example, the server computer 1100A can be a dedicated server computer operable to process and communicate data to and from the client computing devices 1100B-1100G via any of a number of known protocols, such as, hypertext transfer protocol ("HTTP"), file transfer protocol ("FTP"), or simple object access protocol ("SOAP"). Additionally, the network computing environment 1100 can utilize various data security protocols such as secured socket layer ("SSL") or pretty good privacy ("PGP"). Each of the client computing devices 1100B-1100G can be equipped with an operating system operable to support one or more computing applications or terminal sessions such as a web browser (not shown in FIG. 11), or other graphical UI, including those illustrated above, or a mobile desktop environment (not shown in FIG. 11) to gain access to the server computer 1100A.

The server computer 1100A can be communicatively coupled to other computing environments (not shown in FIG. 11) and receive data regarding a participating user's interactions/resource network. In an illustrative operation, a user (not shown in FIG. 11) may interact with a computing application running on a client computing device 1100B-1100G to obtain desired data and/or perform other computing applications.

The data and/or computing applications may be stored on the server 1100A, or servers 1100A, and communicated to cooperating users through the client computing devices 1100B-1100G over an exemplary communications network 1120. A participating user (not shown in FIG. 11) may request access to specific data and applications housed in whole or in part on the server computer 1100A. These data may be communicated between the client computing devices 1100B-1100G and the server computer 1100A for processing and storage.

The server computer 1100A can host computing applications, processes, applets, or other types of executable program code for the generation, authentication, encryption, and communication of data and applications such as those described above with regard to FIGS. 1-9, and may cooperate with other server computing environments (not shown in FIG. 11), third party service providers (not shown in FIG. 11), and network attached storage ("NAS") and storage area networks ("SAN") to realize application/data transactions.

It should be appreciated that the computing architecture shown in FIG. 10 and the distributed network computing environment shown in FIG. 11 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: determining that a security group has been created at a first storage system, the security group identifying one or more users; and responsive to determining that the security group has been created at the first storage system, causing a second storage system to create a group entity, the group entity identifying the one or more users and having an associated identifier assigned by the second storage system, storing the identifier in association with one or more documents stored at the first storage system, and synchronizing the one or more documents from the first storage system to the second storage system by transmitting the identifier and the documents from the first storage system to the second storage system, whereby the second storage system utilizes the identifier to associate the one or more documents with the group entity.

Clause 2. The computer-implemented method of clause 1, further comprising: determining that the security group has been deleted; and responsive to determining that the security group has been deleted, deleting the identifier stored in association with the one or more documents from the first storage system, causing the second storage system to delete the group entity, and resynchronizing the one or more documents from the first storage system to the second storage system.

Clause 3. The computer-implemented method of any of clauses 1 or 2, further comprising: determining that membership in the security group has been updated; and responsive to determining that membership in the security group has been updated, causing the second storage system to update the membership of the group entity such that membership in the security group is the same as membership in the group entity.

Clause 4. The computer-implemented method of any of clauses 1-3, further comprising: defining a property for a tenant of the first storage system, the property specifying one or more sites for which synchronization of security groups is to be performed; periodically identifying sites associated with the tenant for which synchronization of security groups is to be performed; adding the identified sites to the property; and for each site identified by the property, synchronizing security groups associated with the site from the first storage system to the second storage system, and synchronizing documents associated with the site from the first storage system to the second storage system.

Clause 5. The computer-implemented method of any of clauses 1-4, wherein the sites associated with the tenant for which synchronization of security groups is to be performed are identified based, at least in part, on a number of documents associated with the sites.

Clause 6. The computer-implemented method of any of clauses 1-5, wherein the first storage system comprises a content service.

Clause 7. The computer-implemented method of any of clauses 1-6, wherein the second storage system comprises an indexing service.

Clause 8. A computer-readable storage medium having computer-executable instructions stored thereupon which, when executed by a computing device, cause the computing device to: determine that a security group has been created at a first storage system, the security group identifying one or more users; and responsive to determining that the security group has been created at the first storage system, cause a second storage system to create a group entity, the group entity identifying the one or more users and having an associated identifier assigned by the second storage system, store the identifier in association with one or more documents stored at the first storage system, and synchronize the one or more documents from the first storage system to the second storage system by transmitting the identifier and the documents from the first storage system to the second storage system, whereby the second storage system utilizes the identifier to associate the one or more documents with the group entity.

Clause 9. The computer-readable storage medium of clause 8, having further computer-executable instructions stored thereupon which, when executed by the computing device, cause the computing device to: determine that the security group has been deleted; and responsive to determining that the security group has been deleted, delete the identifier stored in association with the one or more documents from the first storage system, cause the second storage system to delete the group entity, and resynchronize the one or more documents from the first storage system to the second storage system.

Clause 10. The computer-readable storage medium of any of clauses 8 or 9, having further computer-executable instructions stored thereupon which, when executed by the computing device, cause the computing device to: determine that membership in the security group has been updated; and responsive to determining that membership in the security group has been updated, cause the second storage system to update the membership of the group entity such that membership in the security group is the same as membership in the group entity.

Clause 11. The computer-readable storage medium of any of clauses 8-10, having further computer-executable instructions stored thereupon which, when executed by the computing device, cause the computing device to: define a property for a tenant of the first storage system, the property specifying one or more sites for which synchronization of security groups is to be performed; periodically identify sites associated with the tenant for which synchronization of security groups is to be performed; add the identified sites to the property; and for each site identified by the property, synchronizing security groups associated with the site from the first storage system to the second storage system, and synchronizing documents associated with the site from the first storage system to the second storage system.

Clause 12. The computer-readable storage medium of any of clauses 8-11, wherein the sites associated with the tenant for which synchronization of security groups is to be performed are identified based, at least in part, on a number of documents associated with the sites.

Clause 13. The computer-readable storage medium of any of clauses 8-12, wherein the first storage system comprises a content service.

Clause 14. The computer-readable storage medium of any of clauses 8-13, wherein the second storage system comprises an indexing service.

Clause 15. A computing device, comprising: at least one processor; and a computer-readable storage medium having computer-executable instructions stored thereupon which, when executed by the at least one processor, cause the computing device to: determine that a security group has been created at a first storage system, the security group identifying one or more users; and responsive to determining that the security group has been created at the first storage system, cause a second storage system to create a group entity, the group entity identifying the one or more users and having an associated identifier assigned by the second storage system, store the identifier in association with one or more documents stored at the first storage system, and synchronize the one or more documents from the first storage system to the second storage system by transmitting the identifier and the documents from the first storage system to the second storage system, whereby the second storage system utilizes the identifier to associate the one or more documents with the group entity.

Clause 16. The computing device of clause 15, wherein the computer-readable storage medium has further computer-executable instructions stored thereupon which, when executed by the computing device, cause the computing device to: determine that the security group has been deleted; and responsive to determining that the security group has been deleted, delete the identifier stored in association with the one or more documents from the first storage system, cause the second storage system to delete the group entity, and resynchronize the one or more documents from the first storage system to the second storage system.

Clause 17. The computing device of any of clauses 15 or 16, wherein the computer-readable storage medium has further computer-executable instructions stored thereupon which, when executed by the computing device, cause the computing device to: determine that membership in the security group has been updated; and responsive to determining that membership in the security group has been updated, cause the second storage system to update the membership of the group entity such that membership in the security group is the same as membership in the group entity.

Clause 18. The computing device of any of clauses 15-17, wherein the computer-readable storage medium has further computer-executable instructions stored thereupon which, when executed by the computing device, cause the computing device to: define a property for a tenant of the first storage system, the property specifying one or more sites for which synchronization of security groups is to be performed; periodically identify sites associated with the tenant for which synchronization of security groups is to be performed; add the identified sites to the property; and for each site identified by the property, synchronizing security groups associated with the site from the first storage system to the second storage system, and synchronizing documents associated with the site from the first storage system to the second storage system.

Clause 19. The computing device of any of clauses 15-18, wherein the sites associated with the tenant for which synchronization of security groups is to be performed are identified based, at least in part, on a number of documents associated with the sites.

Clause 20. The computing device of any of clauses 15-19, wherein the first storage system comprises a content service and wherein the second storage system comprises an indexing service.

Based on the foregoing, it should be appreciated that technologies for synchronizing security groups have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:
1. A computer-implemented method, comprising:
  determining that a first security group has been created at a first storage system to provide permissible access to one or more documents stored at the first storage system, the first security group supporting a first format to identify one or more users;
  responsive to determining that the first security group has been created at the first storage system:
    causing a second storage system to create a second security group to provide permissible access to the one or more documents and to assign an identifier to the second security group, wherein:
      the second security group supports a second format to identify the one or more users; and
      the second security group does not support the first format supported by the first security group created at the first storage system;
      storing the identifier in association with the one or more documents stored at the first storage system; and
    synchronizing the one or more documents from the first storage system to the second storage system by transmitting the identifier and the one or more documents from the first storage system to the second storage system, whereby the second storage system utilizes the identifier to associate the one or more documents with the second security group;
  determining that the first security group has been deleted;
  responsive to determining that the first security group has been deleted:
    deleting the identifier stored in association with the one or more documents from the first storage system;

causing the second storage system to delete the second security group; and resynchronizing the one or more documents from the first storage system to the second storage system.

2. The computer-implemented method of claim 1, further comprising:

determining that membership in the first security group has been updated; and responsive to determining that membership in the first security group has been updated, causing the second storage system to update the membership of the second security group such that membership in the first security group is the same as membership in the second security group.

3. The computer-implemented method of claim 1, further comprising:

defining a property for a tenant of the first storage system, the property specifying one or more sites for which synchronization of security groups is to be performed;

periodically identifying additional sites associated with the tenant for which synchronization of the security groups is to be performed;

adding the additional sites to the property; and for each site identified by the property:
synchronizing one or more security groups associated with the site from the first storage system to the second storage system, and
synchronizing documents associated with the site from the first storage system to the second storage system.

4. The computer-implemented method of claim 3, wherein the additional sites associated with the tenant for which synchronization of the security groups is to be performed are identified based, at least in part, on a number of documents associated with the additional sites.

5. The computer-implemented method of claim 1, wherein the first storage system comprises a content service.

6. The computer-implemented method of claim 1, wherein the second storage system comprises an indexing service.

7. A computer-readable storage medium having computer-executable instructions stored thereupon which, when executed by a computing device, cause the computing device to:

determine that a first security group has been created at a first storage system to provide permissible access to one or more documents stored at the first storage system, the first security group supporting a first format to identify one or more users;

responsive to determining that the first security group has been created at the first storage system:
cause a second storage system to create a second security group to provide permissible access to the one or more documents and to assign an identifier to the second security group, wherein:
the second security group supports a second format to identify the one or more users; and
the second security group does not support the first format supported by the first security group created at the first storage system;
store the identifier in association with the one or more documents stored at the first storage system; and
synchronize the one or more documents from the first storage system to the second storage system by transmitting the identifier and the one or more documents from the first storage system to the second storage system, whereby the second storage system utilizes the identifier to associate the one or more documents with the second security group;

determine that the first security group has been deleted;

responsive to determining that the first security group has been deleted:
delete the identifier stored in association with the one or more documents from the first storage system;
cause the second storage system to delete the second security group; and
resynchronize the one or more documents from the first storage system to the second storage system.

8. The computer-readable storage medium of claim 7, having further computer-executable instructions stored thereupon which, when executed by the computing device, cause the computing device to:

determine that membership in the first security group has been updated; and responsive to determining that membership in the first security group has been updated, cause the second storage system to update the membership of the second security group such that membership in the first security group is the same as membership in the second security group.

9. The computer-readable storage medium of claim 7, having further computer-executable instructions stored thereupon which, when executed by the computing device, cause the computing device to:

define a property for a tenant of the first storage system, the property specifying one or more sites for which synchronization of security groups is to be performed;

periodically identify additional sites associated with the tenant for which synchronization of the security groups is to be performed;

add the additional sites to the property; and for each site identified by the property:
synchronize one or more security groups associated with the site from the first storage system to the second storage system, and
synchronize documents associated with the site from the first storage system to the second storage system.

10. The computer-readable storage medium of claim 9, wherein the additional sites associated with the tenant for which synchronization of the security groups is to be performed are identified based, at least in part, on a number of documents associated with the additional sites.

11. The computer-readable storage medium of claim 7, wherein the first storage system comprises a content service.

12. The computer-readable storage medium of claim 7, wherein the second storage system comprises an indexing service.

13. A computing device, comprising:

at least one processor; and a computer-readable storage medium having computer-executable instructions stored thereupon which, when executed by the at least one processor, cause the computing device to:

determine that a first security group has been created at a first storage system to provide permissible access to one or more documents stored at the first storage system, the first security group supporting a first format to identify one or more users;

responsive to determining that the first security group has been created at the first storage system:

cause a second storage system to create a second security group to provide permissible access to the one or more documents and to assign an identifier to the second security group, wherein:
  the second security group supports a second format to identify the one or more users; and
  the second security group does not support the first format supported by the first security group created at the first storage system;
store the identifier in association with the one or more documents stored at the first storage system; and
synchronize the one or more documents from the first storage system to the second storage system by transmitting the identifier and the one or more documents from the first storage system to the second storage system, whereby the second storage system utilizes the identifier to associate the one or more documents with the second security group;
determine that the first security group has been deleted;
responsive to determining that the first security group has been deleted:
  delete the identifier stored in association with the one or more documents from the first storage system;
  cause the second storage system to delete the second security group; and
  resynchronize the one or more documents from the first storage system to the second storage system.

14. The computing device of claim 13, wherein the computer-readable storage medium has further computer-executable instructions stored thereupon which, when executed by the computing device, cause the computing device to:

determine that membership in the first security group has been updated; and
responsive to determining that membership in the first security group has been updated, cause the second storage system to update the membership of the second security group such that membership in the first security group is the same as membership in the second security group.

15. The computing device of claim 13, wherein the computer-readable storage medium has further computer-executable instructions stored thereupon which, when executed by the computing device, cause the computing device to:

define a property for a tenant of the first storage system, the property specifying one or more sites for which synchronization of security groups is to be performed;
periodically identify additional sites associated with the tenant for which synchronization of the security groups is to be performed;
add the additional sites to the property; and
for each site identified by the property:
  synchronize one or more security groups associated with the site from the first storage system to the second storage system, and
  synchronize documents associated with the site from the first storage system to the second storage system.

16. The computing device of claim 15, wherein the additional sites associated with the tenant for which synchronization of the security groups is to be performed are identified based, at least in part, on a number of documents associated with the additional sites.

17. The computing device of claim 13, wherein the first storage system comprises a content service and wherein the second storage system comprises an indexing service.

* * * * *